(12) United States Patent
Henry et al.

(10) Patent No.: US 11,611,700 B2
(45) Date of Patent: Mar. 21, 2023

(54) UNMANNED AERIAL VEHICLE WITH VIRTUAL UN-ZOOMED IMAGING

(71) Applicant: SKYDIO, INC., Redwood City, CA (US)

(72) Inventors: Peter Benjamin Henry, San Francisco, CA (US); Hayk Martirosyan, San Francisco, CA (US); Abraham Galton Bachrach, Redwood City, CA (US); Clement Godard, Redwood City, CA (US); Adam Parker Bry, Redwood City, CA (US); Ryan David Kennedy, Redwood City, CA (US)

(73) Assignee: SKYDIO, INC., Redwood City, CA (US)

( * ) Notice: Subject to any disclaimer, the term of this patent is extended or adjusted under 35 U.S.C. 154(b) by 0 days.

(21) Appl. No.: 17/373,097

(22) Filed: Jul. 12, 2021

(65) Prior Publication Data
US 2022/0014675 A1 Jan. 13, 2022

Related U.S. Application Data

(60) Provisional application No. 63/050,863, filed on Jul. 12, 2020.

(51) Int. Cl.
| | | |
|---|---|---|
| *H04N 5/232* | (2006.01) | |
| *B64C 39/02* | (2006.01) | |
| *B64D 47/08* | (2006.01) | |
| *G05D 1/08* | (2006.01) | |
| *H04N 5/262* | (2006.01) | |

(52) U.S. Cl.
CPC ....... *H04N 5/23238* (2013.01); *B64C 39/024* (2013.01); *B64D 47/08* (2013.01); *G05D 1/0808* (2013.01); *H04N 5/23216* (2013.01); *H04N 5/23296* (2013.01); *H04N 5/2628* (2013.01); *B64C 2201/127* (2013.01)

(58) Field of Classification Search
None
See application file for complete search history.

(56) References Cited

U.S. PATENT DOCUMENTS

| | | | |
|---|---|---|---|
| 2012/0212640 A1* | 8/2012 | Kojima | H04N 5/272 348/222.1 |
| 2018/0011719 A1* | 1/2018 | Cunningham | G06F 3/0484 |
| 2018/0210442 A1* | 7/2018 | Guo | G05D 1/0016 |
| 2021/0185230 A1* | 6/2021 | Kuo | H04N 5/23299 |

* cited by examiner

*Primary Examiner* — Edemio Navas, Jr.
(74) *Attorney, Agent, or Firm* — Mattingly & Malur, PC

(57) ABSTRACT

In some examples, an unmanned aerial vehicle (UAV) may control a position of a first camera to cause the first camera to capture a first image of a target. The UAV may receive a plurality of second images from a plurality of second cameras, the plurality of second cameras positioned on the UAV for providing a plurality of different fields of view in a plurality of different directions around the UAV, the first camera having a longer focal length than the second cameras. The UAV may combine at least some of the plurality of second images to generate a composite image corresponding to the first image and having a wider-angle field of view than the first image. The UAV may send the first image and the composite image to a computing device.

20 Claims, 7 Drawing Sheets

UNMANNED AERIAL VEHICLE WITH VIRTUAL UN-ZOOMED IMAGING

CROSS-REFERENCE TO RELATED APPLICATION

This application claims the benefit of U.S. Provisional Patent Application No. 63/050,863, filed Jul. 12, 2020, which is incorporated by reference herein.

BACKGROUND

Unmanned aerial vehicles (UAVs), sometimes referred to as "drones", typically include cameras having telephoto lenses or other long-focal-length lenses for capturing images of targets that may be some distance from the UAV and to make the targets appear magnified. However, the same long-focal-length lens and camera generally cannot also be used for capturing a wide-angle field of view (FOV) of a target and its surroundings. For instance, a wider FOV might be achieved by using a variable zoom lens or by using an additional camera having a different lens with a wider FOV. However, these options have several disadvantages when applied on a UAV. For example, a variable zoom lens may be expensive and bulky. Similarly, adding a second camera and lens for capturing a wide-angle FOV will also add weight and complexity to the UAV. Accordingly, either of these options can increase the cost of the UAV while reducing the UAV's overall performance due to the increased weight.

BRIEF DESCRIPTION OF THE DRAWINGS

The detailed description is set forth with reference to the accompanying figures. In the figures, the leftmost digit(s) of a reference number identifies the figure in which the reference number first appears. The use of the same reference numbers in different figures indicates similar or identical items or features.

DESCRIPTION

Figure 1:
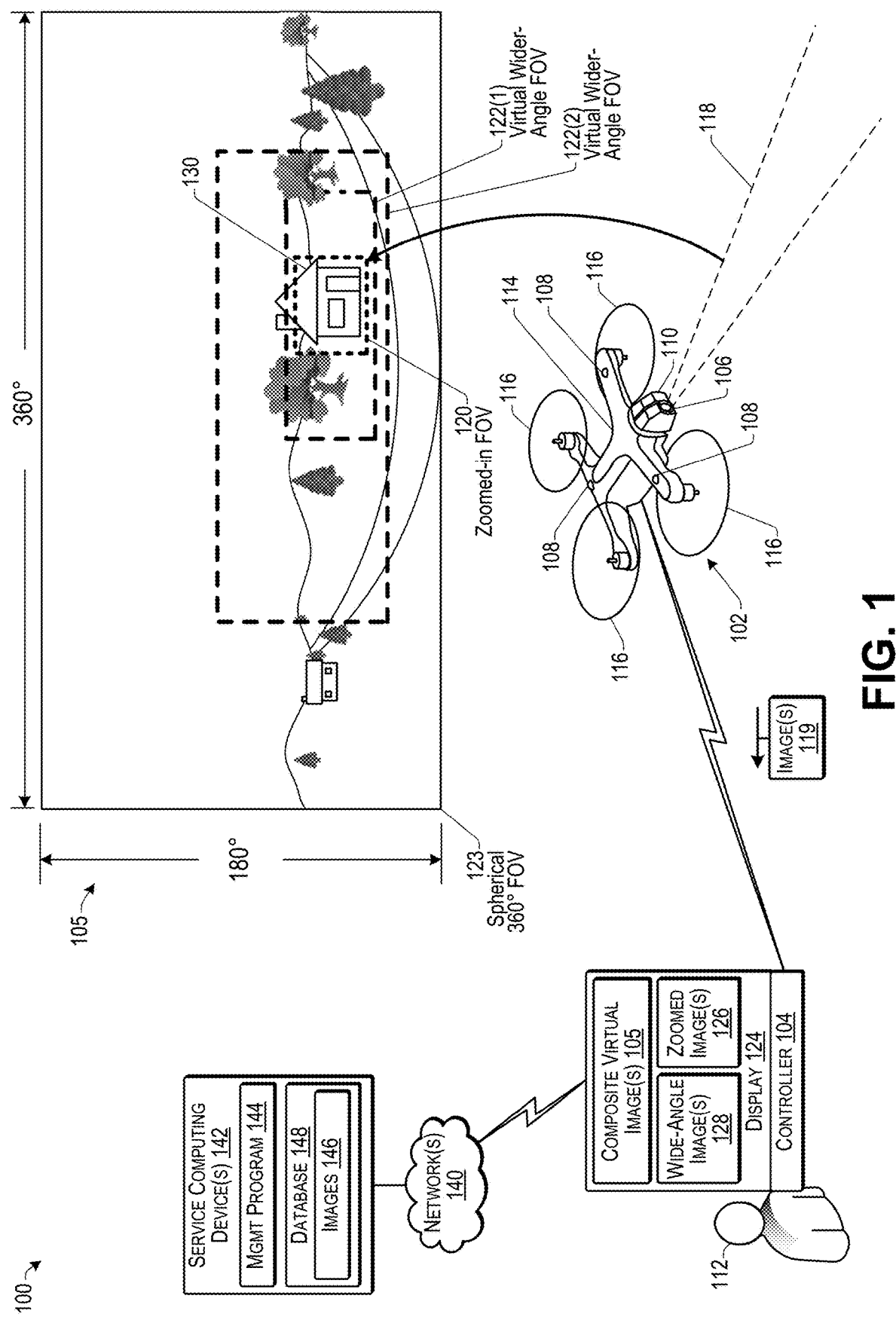
FIG. 1 illustrates an example system including an unmanned aerial vehicle (UAV) able to provide zoomed-in and zoomed-out images with smooth transitions in between according to some implementations.

Some implementations herein are directed to techniques and arrangements for enabling a virtual zooming-out or other transition and capturing of wider-angle images beyond the capabilities of a longer-focal-length main camera lens on a UAV. As one example, the techniques herein may be used to provide a wide-angle or panoramic view of a target that is the current subject of the focus of the longer-focal-length camera of the UAV. While this is typically not possible with a single physical lens, implementations herein may fuse or otherwise combine the images captured by multiple wide angle lenses of a plurality of wider-angle cameras mounted on the UAV and that are also used for navigation of the UAV.

The captured images from the plurality of wider-angle cameras may be combined to generate a virtual image of a target and the area surrounding the target and the UAV. In some examples, the wider-angle cameras may be positioned at various locations on the body of the UAV to provide a full spherical 360 degrees of coverage of the space around the UAV. Thus, the combined images may be used to simulate an image that could be captured by a wider-angle lens in any direction around the UAV, e.g., capturing a wider FOV than the lens of the longer-focal-length camera is capable of capturing. Accordingly, by merging multiple FOVs from multiple different wide-angle lenses of the wider-angle cameras in real time, the examples herein are able provide a virtual un-zoomed image of any desired target area, e.g., by being able to smoothly transition from the focal point of the longer-focal-length camera all the way to a 360 degree FOV and full coverage of an area surrounding the target, if desired, while also providing a zoomed-in or otherwise magnified view of the target through the FOV provided by the longer-focal-length camera.

Some examples herein may assemble the images captured by each of the plurality of wider-angle cameras into a combined virtual image that covers the full spatial coverage around the UAV in a spherical 360 degree FOV. For instance, the wider-angle cameras mounted on the body of the UAV may be calibrated with respect to each other so that, for each pixel in each of the images captured by the respective wider-angle cameras, the precise corresponding three-dimensional (3D) orientation with respect to a virtual sphere surrounding the UAV is known. In some cases, six wider-angle cameras may be employed with FOVs sufficiently wide (e.g., 200 degree FOVs) and are positioned on the body of the UAV for covering the entire spherical space around the UAV. Furthermore, to improve efficiency during image processing, for each pixel in the combined virtual image where there are multiple overlapping pixels from multiple captured images from different ones of the wider-angle cameras, a processor may read the pixel from a single input image rather than processing the same pixel location for multiple images from overlapping camera FOVs. Additionally, to further reduce the computational requirements during image processing, some examples herein may pre-compute from which camera each pixel in the virtual image is received.

Furthermore, since 360 degree panoramic images may be disorienting in motion, some implementations herein may perform several smooth interpolations when generating an un-zoomed virtual image, e.g., FOV interpolation and orientation interpolation. For example, when determining an un-zoomed FOV for the virtual image, the FOV may be smoothly interpolated from the longer-focal-length camera FOV to the 360 degree virtual image. In addition, some examples may include interpolation of the orientation of the virtual image when generating the un-zoomed virtual image, such that when the un-zoomed virtual image is generated, the horizon may be generally level (e.g., based on alignment with gravity or the like) despite the orientation of the UAV and/or the wider-angle cameras.

Additionally, some examples herein may use one or more range maps, such as may be determined from the wider-angle camera images using any of various techniques, such as a deep learning convolutional neural network, a stereo vision parallax determination algorithm, or other suitable computational model. For instance, the range maps may indicate the distance from the UAV to particular objects in the respective images to enable a more accurate image alignment of the multiple respective images captured by the multiple respective wider-angle cameras. The one or more range maps may be employed to precisely align and blend the images captured by the wider-angle cameras into the final composite virtual image, resulting in higher image quality and accuracy for the composite virtual image.

For discussion purposes, some example implementations are described in the environment of a UAV creating a composite virtual image using a plurality of images received from a plurality of wider-angle cameras and images received from a longer-focal-length camera for enabling a virtual zooming-in or zooming-out of an image of a target. However, implementations herein are not limited to the particular examples provided, and may be extended to other types of cameras, other types of vehicles, other vehicle configurations, other types of image processing, and so forth, as will be apparent to those of skill in the art in light of the disclosure herein.

FIG. 1 illustrates an example system 100 including an unmanned aerial vehicle (UAV) 102 able to provide zoomed-in and zoomed-out images with smooth transitions in between according to some implementations. In this example, the UAV 102 is viewed from above at an oblique angle and is able to communicate with a controller 104. The controller 104 may be or may include a computing device in some cases. As one example, the controller 104 may include a mobile device, such as a mobile phone, tablet computing device, wearable device, laptop computer, or the like, that is able to communicate wirelessly with the UAV 102, such as directly or, alternatively, indirectly through another device.

One or more processors (not shown in FIG. 1) onboard the UAV 102 may be configured by executable instructions to receive images from a plurality of cameras mounted on the UAV 102 and the images may be combined to generate a composite virtual image 105. The cameras onboard the UAV 102 may include a longer-focal-length camera 106 and a plurality of wider-angle cameras 108. For instance, the longer-focal-length camera 106 may include a telephoto lens or may otherwise have a longer focal length than the wider-angle cameras 108. The wider-angle cameras 108 may have a shorter focal length and wider field of view (FOV) than the longer-focal-length camera 106. In some examples, the longer-focal-length camera 106 may be mounted on a gimbal 110 to enable the longer-focal-length camera 106 to be aimed at a desired target object or the like. The composite virtual image 105 in this example may be an equirectangular 360 degree view of the surroundings of the UAV 102; however, implementations herein are not limited to an equirectangular configuration for the composite virtual image 105.

The UAV 102 is able to communicate with the controller 104, such as via wireless communications. The controller 104 may be controlled by a user 112 in some examples, and may be configured to communicate with the UAV 102 through any of a variety of types of wireless communications. As several examples, the controller 104 may communicate via various types of radio protocols and frequencies, such as via a Wi-Fi network, a BLUETOOTH® radio link, direct ISM band communications, or any other suitable radio communications. For example, 900 MHz, 2.4 GHz and 5.8 GHz are the most common radio frequencies used for two-way communications with UAVs, but implementations herein are not limited to any particular communication types, frequencies, or protocols.

The UAV 102 includes a body 114 and one or more propulsion devices 116. A first set of the wider-angle cameras 108 are mounted on an upper side of the body 114. Additionally, the longer-focal-length camera 106 may include fixed-focal-length lens or, alternatively, may include an optically zoomable lens that provides an FOV 118 to enable the longer-focal-length camera 106 to focus on a target (e.g., target 130 discussed below) from a distance and provide a magnified (zoomed-in) image of the target. Furthermore, in some examples, each of the wider-angle cameras 108 may include a wide FOV, such as a 180 degree hemispherical FOV, a 200 degree semispherical FOV, or the like (not shown in FIG. 1 for clarity). Accordingly, the FOV 118 of the longer-focal-length camera 106 may be substantially narrower than the FOVs of the individual wider-angle cameras 108.

As discussed above, the UAV 102 may capture images through the longer-focal-length camera 106 and may transmit at least some of the captured images to the controller 104 as a portion of images 119. Furthermore, the UAV 102 may combine images captured by at least some of the plurality of wider-angle cameras 108 on the UAV 102 and the images captured by the longer-focal-length camera 106 to generate the composite virtual image 105. For instance, in some examples, the composite virtual image 105 may be a spherical 360 degree FOV of the surroundings of the UAV 102. Accordingly, the composite virtual image 105 in some examples may represent 360 degrees horizontally by 180 degrees vertical, although other specifications or orientations may be used in other examples. At least a portion of the composite virtual images 105 may be sent as a portion of the images 119 sent to the controller 104.

The controller 104 may receive the images 119 (which may include video or still images) from the UAV 102 via the wireless communication link. For example, the images 119 may include a zoomed-in FOV 120, any number of virtual wider-angle FOVs, such as virtual wider-angle FOV 122(1) and 122(2), up to a spherical 360 degree FOV 123. The user 112 may use a display 124 associated with the controller 104 to view, e.g., zoomed images 126, wide-angle images 128 and/or the entire composite virtual images 105.

In some examples, the user 112 may use the controller 104 to control an image presented on the display 124 associated with the controller 104, such as to zoom in or zoom out a presented image. For instance, the user 112 may use the controller 104 to make one or more inputs to a touchscreen associated with the display 124 that may cause the UAV 102 to aim the longer-focal-length camera 106 at a desired target, change the aim of the longer-focal-length camera 106 dynamically, zoom-in or zoom-out on a desired target (optical and/or digital zoom) and the like. The UAV 102 may dynamically update the composite virtual image 105 as the focal point of the longer-focal-length camera 106 is changed by the user 112 manipulating the controller 104 or, alternatively, as the focal point is changed under autonomous control of the UAV 102.

Further, the user 112 may use the controller 104 to issue other conventional commands to the UAV 102, e.g., "take-off", "land", "follow", such as via one or more virtual controls presented in a graphical user interface (GUI) and/or via one or more physical controls, such as joysticks, buttons, or the like, included on the controller 104 (not shown in FIG. 1). Accordingly, the controller 104 may allow the user 108 to make manual control inputs for controlling the UAV 102 and/or for instructing the UAV 102 to operate autonomously. An example controller 104 is illustrated and discussed additionally below with respect to FIGS. 4 and 7.

The processor(s) onboard the UAV 102 may be configured by executable instructions to capture or otherwise receive images from the cameras 106, 108. In this example, the captured images from the plurality of wider-angle cameras 108 are combined to generate the composite virtual image 105 of a target 130 and the area surrounding the target 130. As one example, the composite virtual image 105 may be used to simulate virtual wide-angle FOV images 122(1) and 122(2) that would be able to be captured by a wider-angle lens focused on the target 130 that is also the focus of the longer-focal-length camera 106 as indicated at 120 which shows the focused zoomed-in field of view on the virtual image 105. Accordingly, by merging multiple FOVs from multiple different wider-angle cameras 108 in real time, the UAV 102 is able to generate the composite virtual image 105 of any desired target area and provide full coverage images of an area surrounding the target, if desired.

In some examples, the virtual wide-angle FOV image(s) 122(1) and/or 122(2) may be provided to the controller 104 in real time when one or more zoomed-in images of the target 130 are captured through the FOV of the longer-focal-length camera 106. Additionally, or alternatively, the entire composite virtual image 105 may be included with the images 119 sent to the controller 104.

The controller 104 may include the associated display 124 that may be used to present at least one of the zoomed image(s) 126 or the wide-angle image(s) 128, or both simultaneously on the display 124. In some examples, the zoomed images 126 and/or the wide angle images 128 may be presented as real-time video, e.g., a sequence of images captured by the UAV 102, such as at a frame rate exceeding a certain frequency. Additionally, or alternatively, in some examples, the entire composite virtual image 105 may be presented on the display 124 such as a still image or a video image. For example, the controller 104 may enable the user 112 to specify which images are provided by the UAV 102 to the controller 104 and/or specify which images are presented on the display 124 at any particular time. For instance, the user 112 may configure the controller 104 to concurrently present a zoomed in image of a target and a wide angle image of the target corresponding to the zoomed in image. Alternatively, the user may present the composite image 105 and may control the level of zoom of the composite image 105 to smoothly zoom out from the fully zoomed-in image provided by the longer-focal-length camera all the way out to the 360 degree spherical FOV, or anywhere in between, and may similarly zoom in while the image smoothly transitions between the composite virtual image and the image provided by the longer-focal-length camera.

Further, the user may browse within the composite image, such as by dragging the composite image to view from various different angles, zooming in on a desired portion of the composite image 105, and so forth. For instance, the user may manipulate the composite image 105 to determine a next target for imaging while the longer-focal-length camera is capturing a current target. Numerous other variations will be apparent to those of skill in the art having the benefit of the disclosure herein.

In some examples, the controller 104 and/or the UAV 102 may be able to communicate over one or more networks 140 with one or more service computing devices 142 or other suitable computing devices. The one or more networks 140 can include any appropriate network or other communication technology, including a wide area network (WAN), such as the Internet; a local area network (LAN), such an intranet; a wireless network, such as a cellular network or other radio communications; a local wireless network, such as Wi-Fi; close-range wireless communications, such as BLUETOOTH®; a wired network, including fiber optics and Ethernet; any combination thereof, or any other suitable communication network or other communication technology.

In some cases, the service computing device(s) 142 may be located remotely from the controller 104 and the UAV 102, such as at a cloud computing location, data center, server farm, or the like. The service computing device(s) 142 may include a management program 144 that may be executed to communicate with the controller 104 and/or the UAV 102, such as for receiving images 146 for storage in a database 148. The images may be any of the images 105, 119, 126 or 128 discussed above. In addition, the management program 144 may perform other functions for managing the images 146 and other information received from the controller 104 and/or from the UAV 102. In some cases, the service computing device 142 may include a web application (not shown in FIG. 1) that may enable the user 112 associated with the controller 104 to access the images 146 in the database 148 and/or other information related to the UAV 102, or the like.

Figure 2:
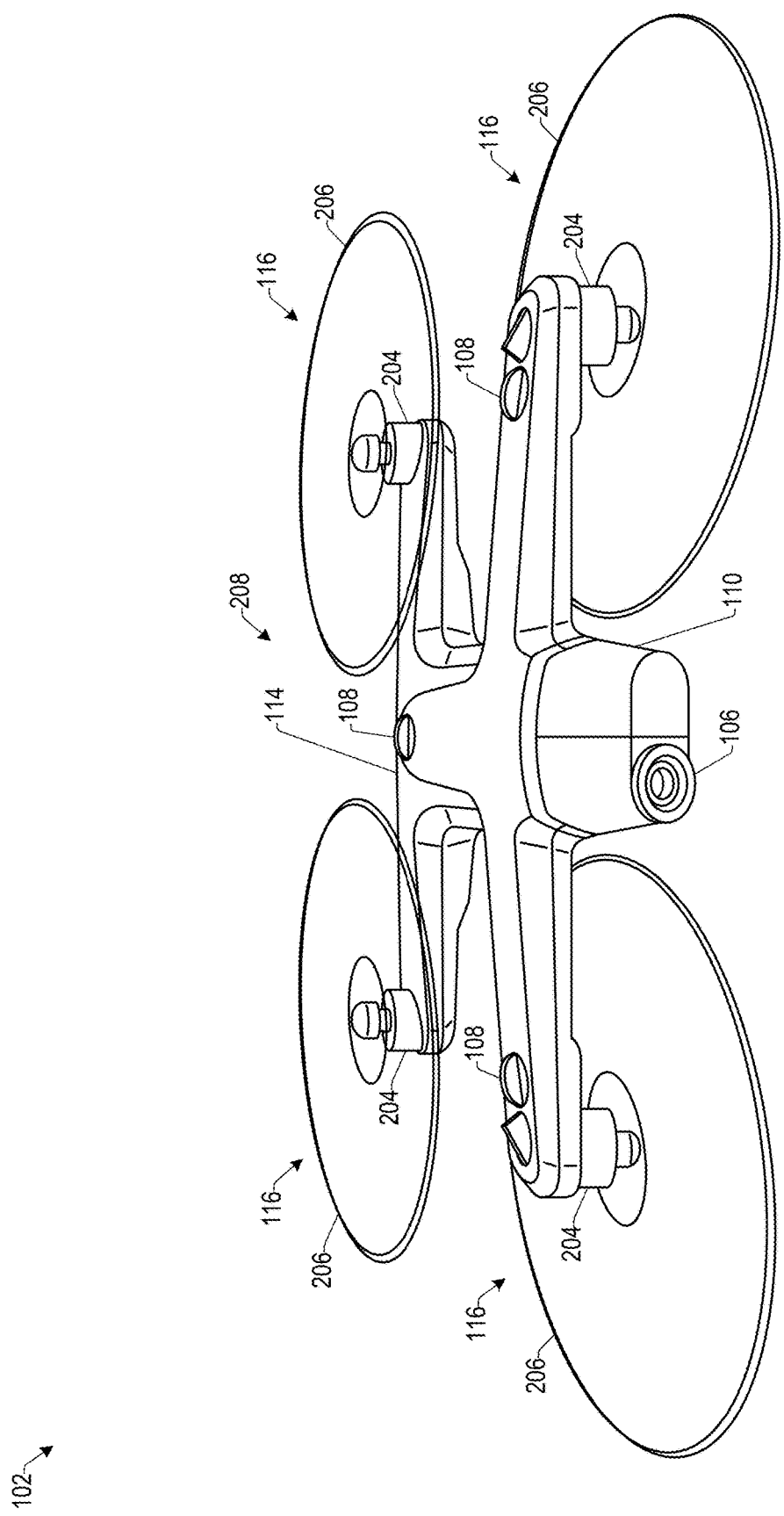
FIG. 2 illustrates an example configuration of a top side of the UAV as viewed from above according to some implementations.

FIG. 2 illustrates an example configuration of a top side of the UAV 102 as viewed from above according to some implementations. In this example, the UAV 102 includes the propulsion devices 116 including four motors 204 and propellers 206. In this example, the UAV 102 is illustrated as a quadcopter drone, but implementations herein are not limited to such.

The UAV 102 includes a plurality of the wider-angle cameras 108 mounted on the body 114 of the UAV 102 and that may be used as navigation cameras. The UAV 102 further includes an aimable and longer-focal-length camera 106 that may include a high-resolution image sensor than those of the wider-angle cameras 108. In some cases, the longer-focal-length camera 106 includes a fixed focal length lens. In other cases, the longer-focal-length camera 106 may include a mechanically controllable, optically zoomable lens. The longer-focal-length camera 106 is mounted on the gimbal 110 that enables aiming of the longer-focal-length camera 106 in approximately a 180 degree hemispherical area to support steady, low-blur image capture and object tracking. For example, the longer-focal-length camera 106 may be used for capturing high resolution images of target objects, providing object tracking video, or various other operations.

In this example, three wider-angle cameras 108 are spaced out around the top side 208 of the UAV 102 and covered by respective fisheye lenses to provide a wide field of view and to support stereoscopic computer vision. The wider-angle cameras 108 on the top side 208 of the UAV 102, as well as those on the bottom side discussed below, may be precisely calibrated with respect to each other following installation of the wider-angle cameras 108 on the body 114 of the UAV 102. As a result of the calibration, for each pixel in each of the images captured by the respective wider-angle cameras, the precise corresponding three-dimensional (3D) orientation with respect to a virtual sphere surrounding the UAV may be determined in advance. In some cases, six wider-angle cameras 108 are employed with FOVs sufficiently wide (e.g., 180 degree FOV, 200 degree FOV, etc.) and are positioned on the body 114 of the UAV 102 for covering the entire spherical space around the UAV 102.

Furthermore, to improve efficiency during image processing, for each pixel in the combined virtual image where there are multiple overlapping pixels from multiple captured images from different ones of the wider-angle cameras 108, the one or more processors on the UAV 102 may read the pixel from a single image rather processing the same pixel location for multiple images from multiple wider-angle cameras 108 having overlapping FOVs. Additionally, to further reduce the computational requirements during image processing, some examples herein may precompute from which camera each pixel in the spherical virtual image is received and the precise location each pixel with respect to the body of the UAV 102 may be known, regardless of the current orientation of the UAV 102.

Figure 3:
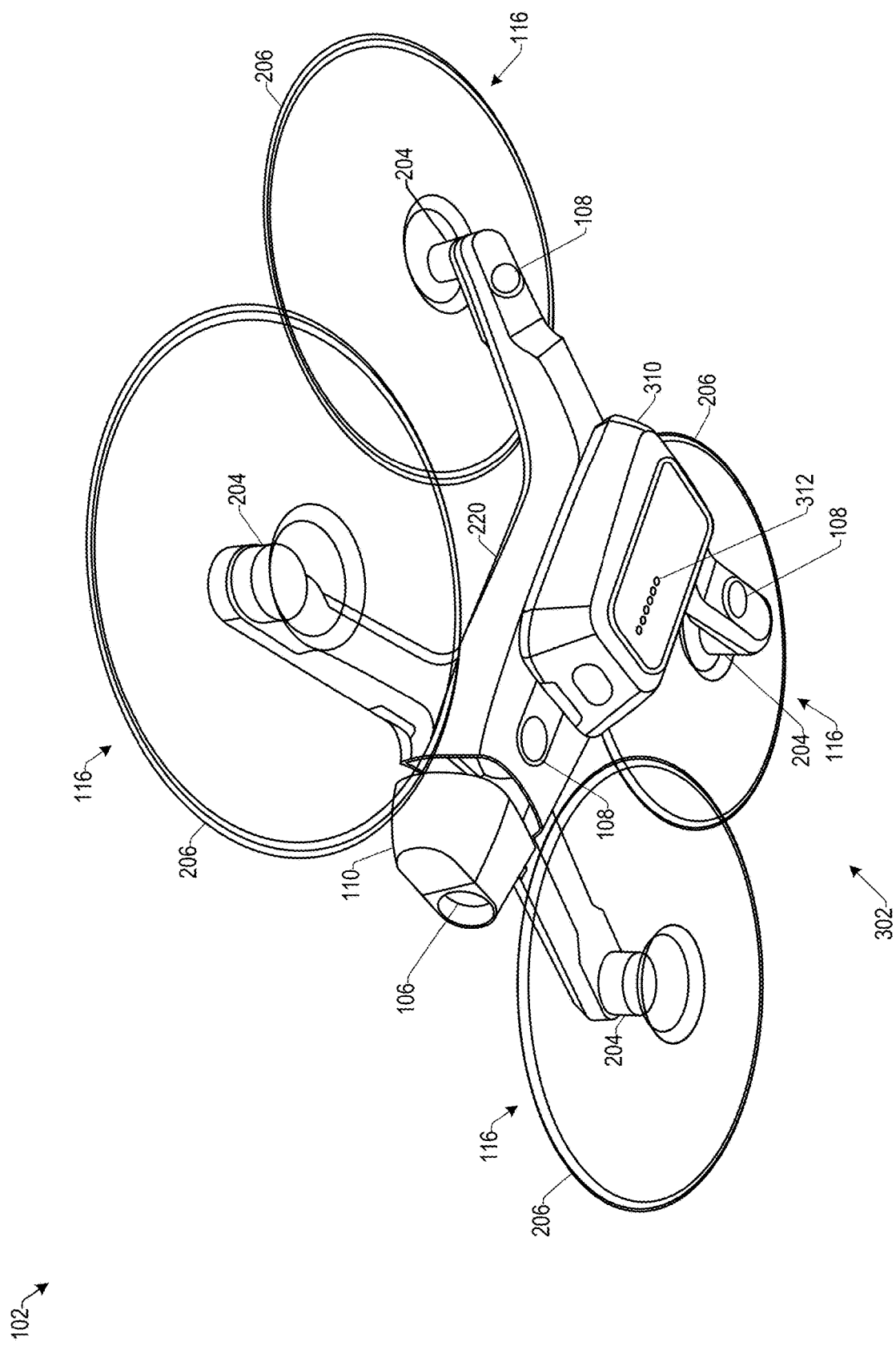
FIG. 3 illustrates an example configuration of a bottom side of the UAV as viewed from below according to some implementations.

FIG. 3 illustrates an example configuration of a bottom side of the UAV 102 as viewed from below according to some implementations. From this perspective three more wider-angle cameras 108 arranged on the bottom side 302 of the UAV 102 are illustrated. The wider-angle cameras 108 on the bottom side 302 may also be covered by respective fisheye lenses to provide a wide field of view and to support stereoscopic computer vision. This array of wider-angle cameras 108 (e.g., three on the top side and three on the bottom side of the UAV 102) may enable visual inertial odometry (VIO) for high resolution localization and obstacle detection and avoidance. For example, the array of wider-angle cameras 108 may be used to scan a surrounding area to obtain range data and provide image information that can be used to generate range maps indicating distances to objects detected in the FOVs of the wider-angle cameras 108, such as for use during autonomous navigation of the UAV 102.

The UAV 102 may also include a battery pack 310 attached on the bottom side 302 of the UAV 102, with conducting contacts 312 to enable battery charging. The UAV 102 also includes an internal processing apparatus including one or more processors and a computer-readable medium (not shown in FIG. 3) as well as various other electronic and mechanical components. For example, the UAV 102 may include a hardware configuration as discussed with respect to FIG. 6 below.

Figure 4:
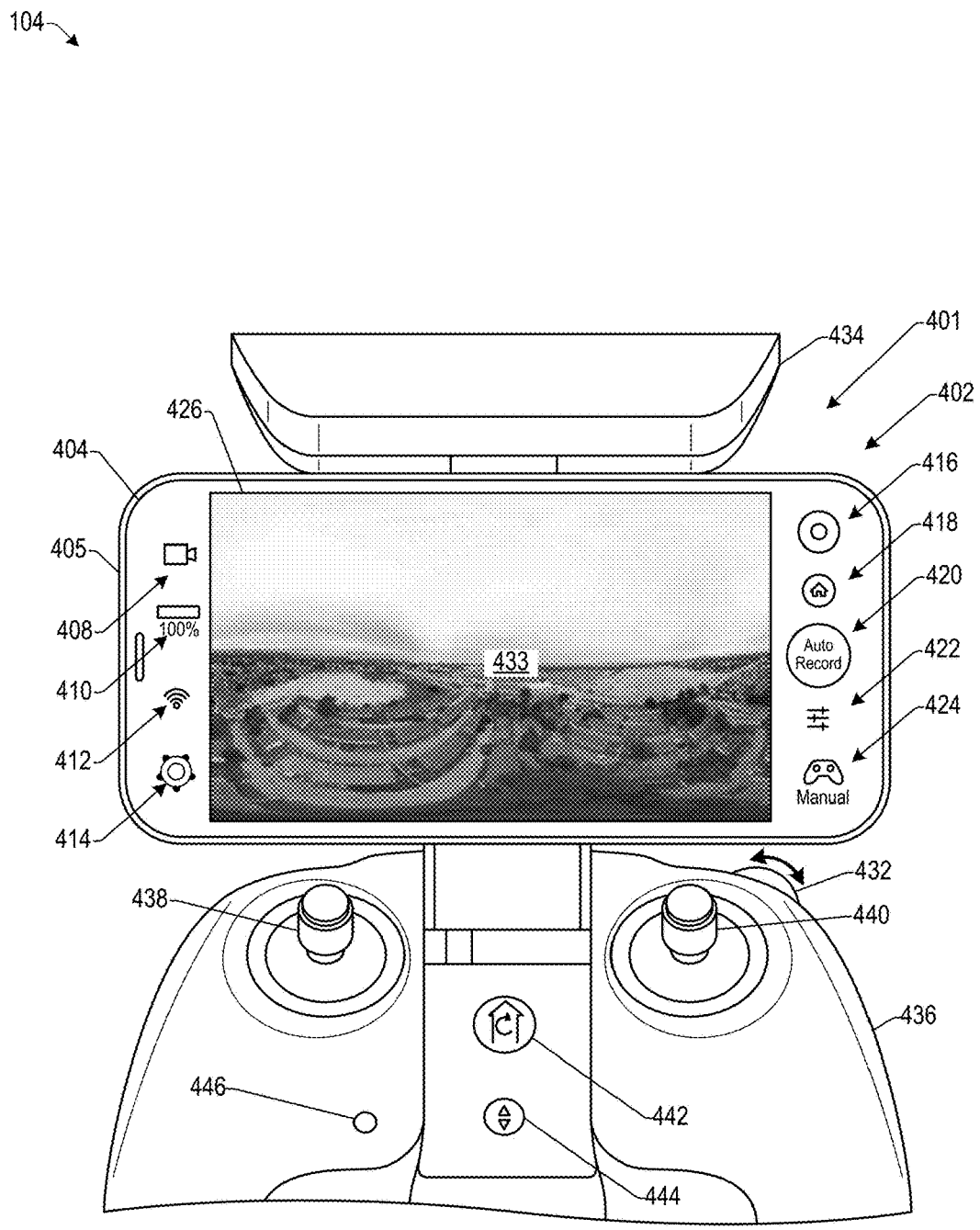
FIG. 4 illustrates an example configuration of the controller including a computing device according to some implementations.

FIG. 4 illustrates an example configuration of the controller 104, which includes a computing device 401 according to some implementations. The controller 104 may present a graphical user interface (GUI) 402 for controlling the UAV 102 and viewing the images 119 received from the UAV 102. The controller 104 may include a touchscreen 404 that may correspond to the display 124 discussed above with respect to FIG. 1. The touchscreen 404 may provide virtual controls and status indicators for controlling and viewing a status of the UAV 102. For example, a camera setting virtual control 408 may enable the user to control the resolution and other settings of at least the longer-focal-length camera 106 on the UAV 102. Furthermore, a battery charge level indicator 410 indicates the current condition of the battery on the UAV 102. A signal strength indicator 412 may indicate a current signal strength of a communication signal with the UAV 102. A settings virtual control 414 may enable the user to control the settings of the controller 104. Furthermore, a map virtual control 416 may enable the user to view the location of the UAV 102 on a map. A home virtual control 418 may enable the user to return to a home screen of the user interface 402. A recording virtual control 420 may enable the user to control the start or stop of recording of a scene currently in the field of view of the longer-focal-length camera 106. A skills virtual control 422 may enable the user to control skill settings for the UAV 102. A manual virtual control 424 may enable the user to switch between manually piloting the UAV 102 or allowing the UAV 102 to autonomously pilot itself.

In addition, the user interface may present an image 426 (e.g., a live video image) of a current field of view of the UAV 102. For example, as mentioned above, the user may be able to zoom in to a magnified view provided by the longer-focal-length camera 106, or un-zoom all the way out to a 360 degree view of the surroundings of the UAV 102 (as illustrated at 426 in FIG. 4) with a smooth transition between the images while zooming and un-zooming. The composite virtual image provided by the UAV 102 may enable the user to view a fully zoomed-in image of a target, a fully zoomed-out image of the target with a 360 degree view around the UAV 102, or an image anywhere in between these two extremes. Interpolation may be used to enable a smooth transition between the zoomed-in image provided by the longer-focal-length camera 106 and an un-zoomed image presented based on a composite of the images provided by the wider-angle cameras 108. The fully un-zoomed image may provide a full omnidirectional view.

As one example, a mechanical rotary control 432 may extend partially outward from the controller 104, and may be rotatable left or right by the user to cause the view presented on the touchscreen 404 to zoom in or zoom out between the fully zoom-in image, the fully zoom-out image, and anywhere in between. Additionally, in some examples, the user may use the touchscreen 404 to browse within the composite virtual image 426 presented on the touchscreen 404 to control a target of the focus of the longer-focal-length camera 106 presented in the image 426. As one example, the user may use a finger to drag an area of interest of the image to the center 433 of the touchscreen 404. In addition, the user may use the touch screen 404 to control the level of zoom presented in the image 426, such as by using a pinch motion to zoom out and a reverse pinch motion, or the like, to zoom in on the desired area of interest. In response, the UAV 102 may receive an indication of these inputs from the GUI 402 and may aim the longer-focal-length camera 106 at the indicated area of interest with very little lag time to enable full zoom imaging at a newly selected location in the composite virtual image 426.

In this example, the touchscreen 404 is part of the computing device 401, such as a smartphone, tablet computing device, or other computing device that may be mounted on the controller 104 using a controller attachment 434. The controller 104 may further include a controller body 436 that includes a plurality of physical controls that may be used to manually control the UAV 102, such as a left joystick 438, a right joystick 440, a home button 442, a launch/land button 444, an LED status indicator 446 that indicates a status of the controller 104, as well as other physical controls not visible in this view. In some examples, a Wi-Fi antenna may be included in the controller attachment 434 so that the controller 104 may provide range-extending communication capabilities for longer distance communications with the UAV 102 than may be possible with the computing device 401 alone.

In some cases, the computing device 401 (or another computing device that is remote from the UAV 102) may execute an application on a processor of the computing device 401. As one example, the application may include a browser that executes a web application that may be served or otherwise provided by the UAV 102 to the computing device 401. For instance, the web application (or another application executed on the computing device 401) may provide the user interface 402 discussed above and may provide other functionalities described herein with respect to the computing device 401, such as enabling communication with the UAV 102, enabling remote control of the UAV 102, and the like. Furthermore, in some cases, the application may enable wireless connection of the computing device 401 to the controller 104 such as via BLUETOOTH® radio, Wi-Fi, or the like.

In some implementations, a portion of the processing that might otherwise be performed by the UAV 102 (e.g., image processing and control functions) may instead be performed by an application running on a processor of the computing device 401 that is remote from the UAV 102. Furthermore, in some examples, the processing workload may be divided between the processor(s) on the UAV 102 and the processor(s) on the computing device 401, such as to achieve reduced processing times. Numerous other variations will be apparent to those of skill in the art having the benefit of the disclosure herein.

Figure 5:
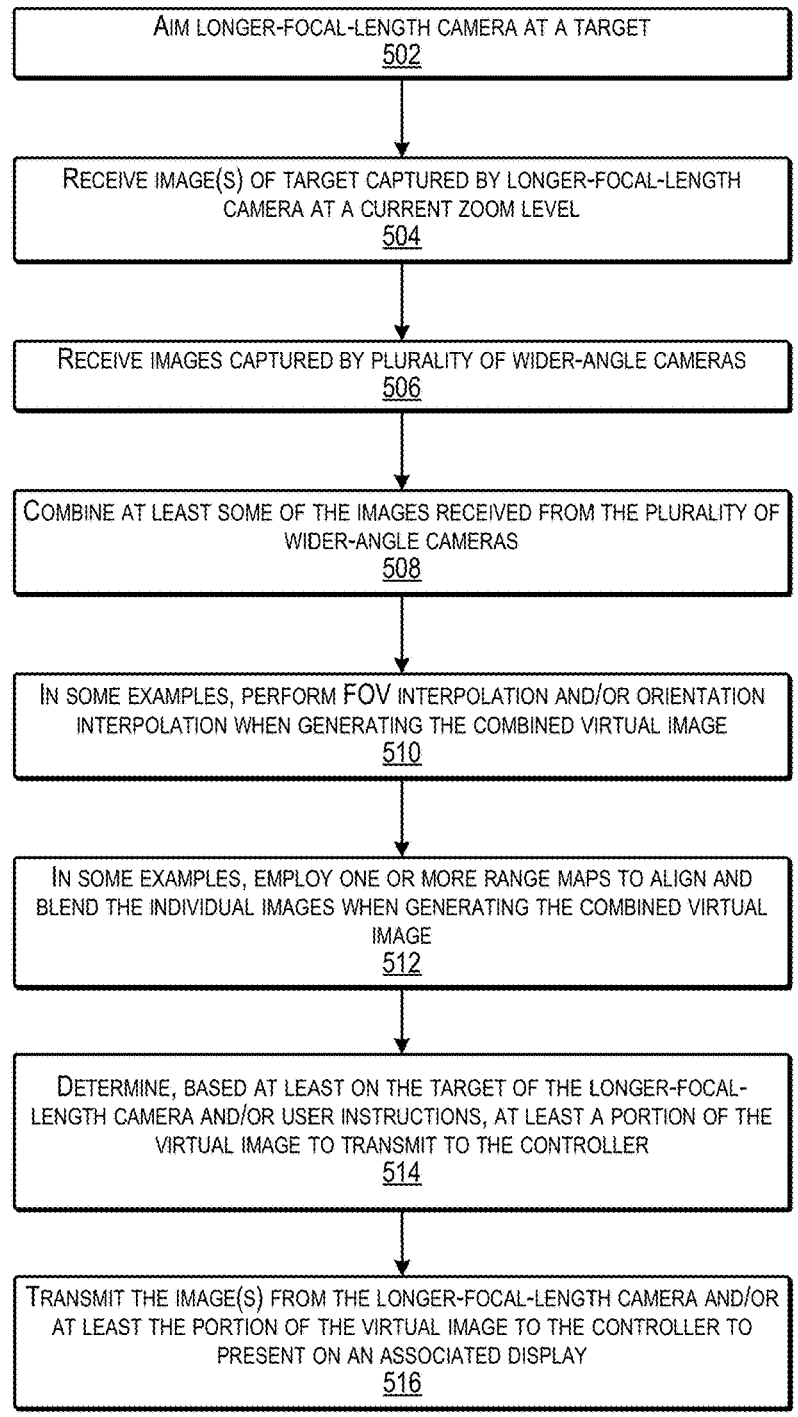
FIG. 5 is a flow diagram illustrating an example process for providing un-zoomed virtual images according to some implementations.

FIG. 5 is a flow diagram illustrating an example process 500 for providing un-zoomed virtual images according to some implementations. The process is illustrated as a collection of blocks, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, systems, and devices described in the examples herein, although the process may be implemented in a wide variety of other environments, systems, and devices.

In some examples, at least a portion of the process 500 may be executed by the UAV 102, such as by executing a UAV image processing program and/or other algorithms as discussed additionally herein. Alternatively, in other examples, a portion of the image processing may be performed on a different computing device, such as the controller 104 discussed above.

At 502, the UAV 102 may aim the movable longer-focal-length camera at target. For example, the gimble discussed above may be used to aim the longer-focal-length camera at the target. Further the zoom level (optical zoom or digital zoom) may be adjusted to zoom in or out depending on the distance and size of the target.

At 504, the UAV 102 may receive image(s) of the target captured by the longer-focal-length camera at the current zoom level. For instance, the UAV 102 may receive a sequence of images captured by the longer-focal-length camera such as for providing video or still images to the controller 104.

At 506, the UAV 102 may receive images captured by the plurality of wider-angle cameras. For example, the wider-angle cameras may be configured to continually provide images of the space surrounding the UAV 102 while the UAV 102 is in flight to aid in autonomous navigation of the UAV 102.

At 508, the UAV 102 may combine at least some of the images received from the plurality of wider-angle cameras. For example, the UAV 102 may assemble the images captured by each of the plurality of wider-angle cameras into a combined virtual image which covers the full spatial coverage around the UAV in a spherical 360 degree FOV. For instance, the wider-angle cameras may be calibrated with respect to each other so that, for each pixel in each of the images captured by the respective wider-angle cameras, the precise corresponding three-dimensional (3D) orientation with respect to a virtual sphere surrounding the UAV is known. In some cases, six wider-angle cameras may be employed with FOVs sufficiently wide (e.g., 200 degree FOVs) and are positioned on the body 114 of the UAV 102 for covering the entire spherical space around the UAV. Furthermore, to improve efficiency during image processing, for each pixel in the combined virtual image where there are multiple overlapping pixels from multiple captured images from different ones of the cameras, a processor may read the pixel from a single input image. Additionally, to further reduce the computational requirements during image processing, some examples herein may precompute from which camera each pixel in the virtual image is coming.

At 510, in some examples, the UAV 102 may perform FOV interpolation and/or orientation interpolation when generating the combined image. For example, since 360 degree panoramic images may be disorienting in motion, some implementations herein may perform two smooth interpolations when generating an un-zoomed virtual image, i.e., FOV interpolation and orientation interpolation. For instance, when determining an un-zoomed FOV for the virtual image, the FOV may be smoothly interpolated from the longer-focal-length camera FOV to the 360 degree virtual image. As one example, a frame (e.g., a rectangle) corresponding to the FOV of the longer-focal-length camera is aligned with the same region of the composite virtual image that best matches the image of the longer-focal-length camera. During interpolation, the region is scaled out to provide the appearance of a smooth zooming out from the image of the longer-focal-length camera to the composite virtual image provided by the wider-angle cameras.

Furthermore, because the cameras are mounted on a vehicle that typically may be moving in multiple degrees of freedom, the motion of cameras may be estimated, e.g., how each camera is moving. This makes it possible for the UAV 102 to dynamically recompute the warp for each image frame from each of the wider-angle cameras. Further, in some examples, all of the wider-angle cameras may be synchronized to take images at the same time to reduce the number of artifacts that might occur between images from different wider-angle cameras. Additionally, as another example, the longer-focal-length camera may also be on the same clock as the wider-angle cameras, which can also make a smoother transition between the image of the longer-focal-length camera and the composite virtual image when zooming out from the image of the longer-focal-length camera to the composite image, or vice versa.

In addition, some examples may include adjustment of the orientation of the virtual image when generating the composite virtual image, such that when the un-zoomed virtual image is generated, the horizon may be generally level (e.g., based on alignment with gravity or the like). As one example, an inertial measurement unit (IMU) onboard the UAV may be used to determine a current attitude of the body of the UAV 102 relative to gravity (e.g., based on readings of one or more accelerometers, gyroscopes, or the like, included in the IMU. The composite virtual image may then be adjusted by an angle determined based on any detected difference between the current attitude of the UAV body and a plane normal to the force of gravity. Alternatively, as another example, the horizon may be recognized from the images using a machine learning model trained on a large number of images of horizons in various different settings. Examples of suitable machine learning models include neural networks, deep learning models, Markov and hidden Markov models, and so forth. Based on recognizing the horizon in the image, the image may be rotated if necessary to make the horizon level with a top or bottom of a frame. Numerous other variations will be apparent to those of skill in the art having the benefit of the disclosure herein.

At 512, in some examples, the UAV 102 may employ one or more range maps to align and blend the individual images from the wider-angle cameras when generating the composite virtual image. For instance, one or more range maps may be generated from the images received from the wider-angle cameras. For example, the wider-angle cameras are offset from each other by a known fixed amount. Accordingly, a parallax may be determined for the same objects recognized in different images from different wider-angle cameras to determine a distance to the recognized objects. In some cases, a deep learning convolutional neural network, or other suitable computational model, machine learning model, or other algorithm may be employed for determining distances to objects in the images. The one or more range maps may be employed to more precisely align and blend the images captured by the wider-angle cameras into the final composite virtual image, resulting in higher image quality and more accurate match at the seams between the images from the different wider-angle cameras.

At 514, the UAV 102 may determine, based at least on the target of the longer-focal-length camera and/or user instructions, at least a portion of the virtual image to transmit to the controller 104. In some examples, the entire composite virtual image is transmitted at a frequency sufficient to provide live video of the current target of the UAV 102 and the surrounding area. Furthermore, the composite image or portion thereof that is sent to the controller 104 may be compressed before sending to shorten download speeds and reduce the amount of communication bandwidth used.

At 516, the UAV 102 may transmit the compressed composite virtual image, or at least the portion of the composite virtual image the image as well as the image from the longer-focal-length camera to the controller 104. As mentioned previously, in some cases the images may be processed and transmitted with sufficient frequency to provide live video to the controller 104.

Figure 6:
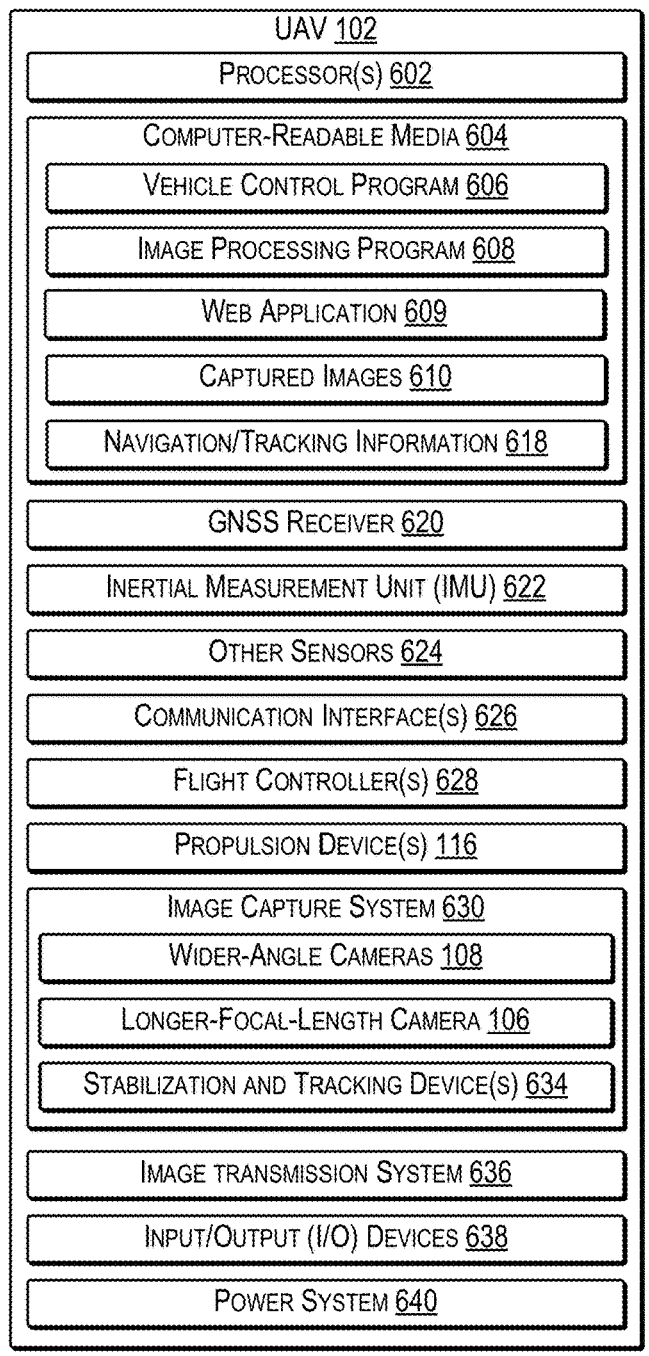
FIG. 6 illustrates select components of an example UAV according to some implementations.

FIG. 6 illustrates select components of an example UAV 102 according to some implementations. In the examples herein, the UAV 102 may sometimes be referred to as a "drone" and may be implemented as any type of UAV capable of controlled flight without a human pilot onboard. For instance, the UAV 102 may be controlled autonomously by one or more onboard processors 602 that execute one or more executable programs. Additionally, or alternatively, the UAV 102 may be controlled via a remote controller, such as through a remotely located controller 104 operated by a human pilot and/or controlled by an executable program executing on or in cooperation with the controller 104.

In the illustrated example, the UAV 102 includes one or more processors 602 and one or more computer readable media 604. For example, the one or more processors 602 may execute software, executable instructions, or the like, for controlling the flight, navigation and other functions of the UAV 102. Each processor 602 may be a single processing unit or a number of processing units, and may include single or multiple computing units or multiple processing cores. The processor(s) 602 can be implemented as one or more microprocessors, microcomputers, microcontrollers, digital signal processors, central processing units, graphics processing units, state machines, logic circuitries, and/or any devices that manipulate signals based on operational instructions. For instance, the processor(s) 602 may be one or more hardware processors and/or logic circuits of any suitable type specifically programmed or configured to execute the algorithms and processes described herein. The processor(s) 602 can be configured to fetch and execute computer-readable instructions stored in the computer-readable media 604, which can program the processor(s) 602 to perform the functions described herein.

The computer-readable media 604 may include volatile and nonvolatile memory and/or removable and non-removable media implemented in any type of technology for storage of information, such as computer-readable instructions, data structures, program modules, or other code and data. Such computer-readable media 604 may include, but is not limited to, RAM, ROM, EEPROM, flash memory or other memory technology, optical storage, solid state storage, magnetic storage, or any other medium that can be used to store the desired information and that can be accessed by a computing device. Depending on the configuration, the computer-readable media 604 may be a type of computer-readable storage media and/or may be a tangible non-transitory media to the extent that, when mentioned herein, non-transitory computer-readable media exclude media such as energy, carrier signals, electromagnetic waves, and signals per se.

The computer-readable media 604 may be used to store any number of functional components that are executable by the processor(s) 602. In many implementations, these functional components comprise instructions or programs that are executable by the processors 602 and that, when executed, specifically configure the one or more processors 602 to perform at least some of the actions attributed above to the UAV 102. Functional components stored in the computer-readable media 604 may include a vehicle control program 606 that may be executed to control autonomous navigation of the UAV 102, as well as for controlling the longer-focal-length camera 106 for aiming the longer-focal-length camera 106 at a target and capturing images thereof. The functional components further includes an image processing program 608 that may be executed for performing the image processing herein, such as for generating the composite virtual images and providing the virtual images for transmission to the controller 104, or the like. In addition, the functional components may include a web application 609 that may be accessed by the controller 104 to use for controlling the UAV 102.

In addition, the computer-readable media 604 may store data used for performing the navigation and scanning operations described herein. Thus, the computer-readable media 604 may store, at least temporarily captured images 610 captured by the wider-angle cameras and the longer-focal-length camera 106. In addition, the computer-readable media may store navigation/tracking information 618 that may be used to navigate the UAV 102 according to one or more instructions, as well as to provide information related to one or more targets for imaging. In addition, the UAV 102 may include many other logical, programmatic, and physical components, of which those described herein are merely examples that are related to the discussion.

To assist in navigation, the UAV 102 may include a global navigation satellite system (GNSS) receiver 620 onboard the UAV 102. The GNSS receiver 620 may be able to receive signals from one or more satellites of a GNSS, such as the Global Positioning Satellite (GPS) system, the Russian Global Navigation Satellite System (GLONASS), the Chinese BeiDou Navigation Satellite System (BDS), the European Union's Galileo system, the Japanese Quasi-Zenith Satellite System (QZSS), the Indian Regional Navigation Satellite System (IRNSS), and so forth.

The UAV 102 may further include an inertial measurement unit (IMU) 622. In some examples, the IMU 622 may be configured to detect linear acceleration and gravity using one or more accelerometers and to detect a rotational rate using one or more gyroscopes. As one example, the IMU 622 may be a self-contained system with a three-axis gyroscope, a three-axis accelerometer, and an embedded processor for processing inputs from the gyroscope and the accelerometer for providing an output of acceleration, attitude, and the like. For instance, the IMU 622 may measure and report the velocity, acceleration, orientation, and gravitational forces on the UAV 102, such as by using the combination of the gyroscopes and accelerometers. In addition, the UAV 102 may include other sensors 624, such as a magnetometer, a barometer, proximity sensors, lidar, radar, ultrasonic, or any of various other types of sensors as is known in the art.

Furthermore, the UAV 102 may include the one or more communication interfaces 626, one or more flight controllers 628, the one or more propulsion devices 116, and an image capture system 630. The image tracking system may include the wider-angle cameras 108, the longer-focal-length camera 106, and one or more stabilization and tracking devices 634, such as the gimbal 110 discussed above.

In addition, the UAV 102 may include an image transmission system 636, input/output (I/O) devices 638, and a power system 640. The components included in the UAV 102 may be able to communicate at least with the one or more processors 602, such as over one or more communication buses, signal lines, or the like (not shown).

The UAV 102 may include more or fewer components than shown in the example of FIG. 6, may combine two or more components as functional units, or may have a different configuration or arrangement of the components. Some of the various components of the example UAV 102 shown in FIG. 6 may be implemented in hardware, software or a combination of both hardware and software, including one or more signal processing and/or application specific integrated circuits.

The flight controller(s) 628 may include a combination of hardware and/or software configured to receive input data (e.g., sensor data, image data, generated trajectories, or other instructions) from the vehicle control program 606, interpret the data and/or instructions, and output control signals to the propulsion devices 202 of the UAV 102. Alternatively, or in addition, the flight controller(s) 628 may be configured to receive control commands generated by another component or device (e.g., processors 602 and/or controller 104), interpret those control commands and generate control signals to the propulsion devices 116 of the UAV 102. In some implementations, the previously mentioned vehicle control program 606 of the UAV 102 may comprise the flight controller(s) 628 and/or any one or more of the other components of the UAV 102. Alternatively, the flight controller(s) 628 may exist as a component separate from the vehicle control program 606.

The communication interface(s) 626 may enable transmission and reception of communications signals, for example, via a radiofrequency (RF) transceiver. In some implementations, the communication interface(s) 626 may include RF circuitry (not shown in FIG. 6). In such implementations, RF circuitry may convert electrical signals to/from electromagnetic signals and communicate with communications networks and other communications devices via the electromagnetic signals. The RF circuitry may include known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and reception of data over communications networks (including public, private, local, and wide area). For example, communications may be over a wide area network (WAN), a local area network (LAN), or a network of networks such as the Internet.

The communication interface(s) 626 may include one or more interfaces and hardware components for enabling communication with various other devices, such as over one or more networks. For example, communication interface(s) 626 may enable communication through one or more of the Internet, cable networks, cellular networks, wireless networks (e.g., Wi-Fi) and wired networks (e.g., fiber optic and Ethernet), as well as close-range radio communications, such as BLUETOOTH®, and the like, as additionally listed elsewhere herein. For example, 900 MHz, 2.4 GHz and 5.8 GHz are the most common radio frequencies used for communicating with UAVs, but implementations herein are not limited to any particular frequency.

The input/output (I/O) devices 638 may include physical buttons (e.g., push buttons, rocker buttons, etc.), LEDs, dials, displays, touch screen displays, speakers, and so forth, that may be used to interact with, or otherwise operate certain features of the UAV 102. The UAV 102 also includes the power system 640 for powering the various components. The power system 640 may include a power management system, one or more power sources (e.g., battery, alternating current, etc.), a recharging system, a power failure detection circuit, a power converter or inverter, a power status indicator (e.g., a light-emitting diode (LED)) and any other components associated with the generation, management and distribution of power in a computerized device.

In some examples, similar to an airplane, the UAV 102 may utilize fixed wings or other aerodynamic surfaces along with one or more propulsion devices 202 to achieve lift and navigation. Alternatively, in other examples, similar to a helicopter, the UAV 102 may directly use the one or more propulsion device(s) 202 to counter gravitational forces and achieve lift and navigation. Propulsion-driven lift (as in the case of helicopters) may offer advantages in some implementations because it allows for more controlled motion along all axes as compared with UAVs that employ fixed aerodynamic surfaces for lift.

The UAV 102 illustrated in FIGS. 1-3 and 6 is an example provided for illustrative purposes. The UAV 102 in accordance with the present disclosure may include more or fewer components than are shown. For example, while a quadcopter is illustrated, the UAV 102 is not limited to any particular UAV configuration and may include hexacopters, octocopters, fixed wing aircraft, or any other type of independently maneuverable aircraft, as will be apparent to those of skill in the art having the benefit of the disclosure herein. Furthermore, while techniques for controlling the navigation of an autonomous UAV 102 for performing a scan of a scan target are described herein, the described techniques may similarly be applied to guide navigation by other types of vehicles (e.g., spacecraft, land vehicles, watercraft, submarine vehicles, etc.).

Figure 7:
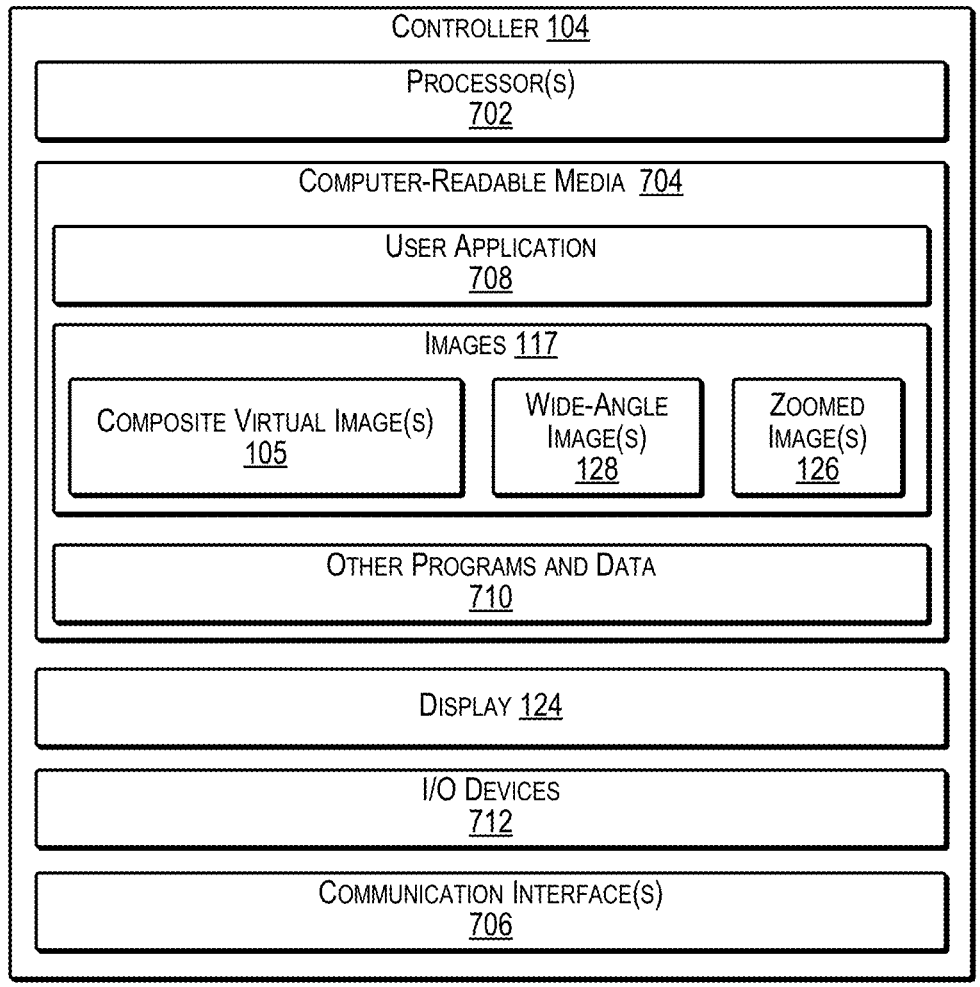
FIG. 7 illustrates select components of an example controller according to some implementations.

FIG. 7 illustrates select components of an example controller 104 according to some implementations. The controller 104 may include components such as at least one processor 702, one or more computer-readable media 704, one or more communication interfaces 706, and one or more input/output (I/O) devices 708. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some cases, the processor 702 may be one or more hardware processors and/or logic circuits of any suitable type specifically programmed or configured to execute the algorithms and processes described herein. The processor 702 can be configured to fetch and execute computer-readable processor-executable instructions stored in the computer-readable media 704.

Depending on the configuration of the controller 104, the computer-readable media 704 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 704 may include, but is not limited to, RAM, ROM, EEPROM, flash memory, solid-state storage, magnetic disk storage, optical storage, and/or other computer-readable media technology. Further, in some cases, the controller 104 may access external storage, such as storage systems, storage arrays, network attached storage, storage area networks, cloud storage, or any other medium that can be used to store information and that can be accessed by the processor 702 directly or through another computing device or network. Accordingly, the computer-readable media 704 may be computer storage media able to store instructions, modules or components that may be executed by the processor 702. Further, when mentioned, non-transitory computer-readable media exclude media such as energy, carrier signals, electromagnetic waves, and signals per se.

The computer-readable media 704 may be used to store and maintain any number of functional components that are executable by the processor 702. In some implementations, these functional components comprise instructions or programs that are executable by the processor 702 and that, when executed, implement operational logic for performing the actions and services attributed above to the controller 104. Functional components of the controller 104 stored in the computer-readable media 704 may include the user application 708, which may enable the user to use the controller to control the UAV remotely as discussed above. In some cases, the user application 708 may access the web application on the UAV 102, while in other cases, the user application 708 may be a standalone controller application.

In addition, the computer-readable media 704 may also store data, data structures and the like, that are used by the functional components. Depending on the type of the controller 104, the computer-readable media 704 may also optionally include other functional components and data, such as other programs and data 710, which may include applications, programs, drivers, etc., and the data used or generated by the functional components. Further, the controller 104 may include many other logical, programmatic and physical components, of which those described are merely examples that are related to the discussion herein.

The communication interface(s) 706 may include one or more interfaces and hardware components for enabling communication with various other devices, such as over the network(s) 140 or directly. For example, communication interface(s) 706 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

In addition, the controller 104 may include the display 124 and a plurality of I/O devices 712. In some cases, the I/O devices 712 may include a graphical user interface (not shown in FIG. 7) for controlling the UAV 102 and viewing images received from the UAV 102. In some examples, the display 124 may include a touchscreen that may provide virtual controls and status indicators for controlling and viewing a status of the UAV 102. In addition, the user interface may include an image (e.g., a live video image) of a current field of view of one or more cameras onboard a UAV, such as the UAV 102.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An unmanned aerial vehicle (UAV) comprising:
   a UAV body including one or more propulsion devices;
   a first camera mounted to be movable relative to the UAV body;
   a plurality of second cameras mounted on the UAV body, the plurality of second cameras positioned on the UAV body for providing a plurality of different fields of view in a plurality of different directions around the UAV body, the first camera having a longer focal length than the second cameras and able to provide a magnified view of a target; and
   one or more processors configured by executable instructions to perform operations comprising:
      receiving, by the one or more processors, from a computing device, an indication of a target for the first camera;
      controlling, by the one or more processors, a position of the first camera to use the first camera to capture a first image of the target;
      receiving a plurality of second images from the plurality of second cameras, respectively;
      combining at least some of the plurality of second images to generate a merged image corresponding to the first image and having a wider-angle field of view than the first image; and
      sending the first image and the merged image to the computing device to cause, at least partially, presentation of a composite image on a display associated with the computing device, the composite image including presentation of at least a portion of the first image, obtained via the first camera, within the merged image obtained via the plurality of second cameras, the presented composite image enabling a user to at least one of: zoom out from the first image to the merged image, or zoom in from the merged image to the first image.

2. The UAV as recited in claim 1, wherein the plurality of second cameras together capture a 360 degree field of view of a space around the UAV, and the merged image provides the 360 degree field of view around the UAV.

3. The UAV as recited in claim 2, wherein the composite image, when presented on the display, enables a user to zoom out from the first image to the 360 degree field of view provided by the merged image by interpolating between the first image received from the first camera and the merged image received from the second cameras.

4. The UAV as recited in claim 1, wherein the operation of combining at least some of the plurality of second images to generate the merged image includes using at least one range map to align one or more of the second images with another one or more of the second images, the range map indicating an estimated distance from the UAV to at least one object included in at least one of the second images.

5. The UAV as recited in claim 1, wherein the UAV employs at least some of the second images received from the plurality of second cameras for controlling the one or more propulsion devices to navigate the UAV.

6. The UAV as recited in claim 1, the operations further comprising:
   determining, based at least on information received from an accelerometer, an attitude of the UAV; and
   rotating the merged image based at least on the attitude of the UAV prior to the presentation of the composite image.

7. A method comprising:
   controlling, by one or more processors of an unmanned aerial vehicle (UAV), a position of a first camera to cause the first camera to capture a first image of a target;
   receiving a plurality of second images from a plurality of second cameras, respectively, the plurality of second cameras positioned on the UAV for providing a plurality of different fields of view in a plurality of different directions around the UAV, the first camera having a longer focal length than the second cameras;
   combining at least some of the plurality of second images to generate a merged image corresponding to the first image and having a wider-angle field of view than the first image; and
   sending the first image and the merged image to a computing device to at least partially cause presentation of a composite image on a display associated with the computing device, the composite image including presentation of at least a portion of the first image, obtained via the first camera, within the merged image obtained via the plurality of second cameras, the presented composite image enabling a user to at least one of: zoom out from the first image to the merged image, or zoom in from the merged image to the first image.

8. The method as recited in claim 7, wherein the first camera is able to provide a magnified image of the target as the first image.

9. The method as recited in claim 7, wherein sending the first image and the merged image to the computing device causes, at least partially, the composite image to be presented on a display associated with the computing device, wherein receiving an indication of a selection of a part of the merged image presented on the display causes the UAV to send, to the computing device, a third image captured by the first camera and corresponding to the selected part of the merged image for updating the composite image to include the third image within the composite image.

10. The method as recited in claim 7, wherein the plurality of second cameras together capture a 360 degree field of view of a space around the UAV, and the merged image provides the 360 degree field of view around the UAV.

11. The method as recited in claim 10, wherein the merged image and the first image, when presented on the display, enable a user to zoom out from the first image to the 360 degree field of view provided by the merged image by interpolating between the first image received from the first camera and the merged image received from the second cameras.

12. The method as recited in claim 7, wherein combining at least some of the plurality of second images to generate the merged image includes using at least one range map to align one or more of the second images with another one or more of the second images, the range map indicating an estimated distance from the UAV to at least one object included in at least one of the second images.

13. The method as recited in claim 7, wherein one or more second cameras of the plurality of second cameras includes at least a 180 degree field of view.

14. The method as recited in claim 7, further comprising:
   determining, based at least on information received from an accelerometer, an attitude of the UAV; and
   rotating the merged image based at least on the attitude of the UAV prior to the presentation of the composite image.

15. An unmanned aerial vehicle (UAV) comprising
a first camera mounted on the UAV;
a plurality of second cameras mounted on the UAV, the plurality of second cameras positioned on the UAV for providing a plurality of different fields of view in a plurality of different directions around the UAV, the first camera having a longer focal length than the second cameras; and
one or more processors configured by executable instructions to perform operations comprising:
  controlling a position of the first camera to cause the first camera to capture a first image of a target;
  receiving a plurality of second images from the plurality of second cameras, respectively, the plurality of second cameras positioned on the UAV for providing a plurality of different fields of view in a plurality of different directions around the UAV;
  combining at least some of the plurality of second images to generate a merged image corresponding to the first image and having a wider-angle field of view than the first image; and
  sending the first image and the merged image to a computing device to at least partially cause presentation of a composite image on a display associated with the computing device, the composite image including presentation of at least a portion of the first image, obtained via the first camera, within the merged image obtained via the plurality of second cameras, the presented composite image enabling a user to at least one of: zoom out from the first image to the merged image, or zoom in from the merged image to the first image.

16. The UAV as recited in claim 15, wherein sending the first image and the merged image to the computing device causes, at least partially, the composite image to be presented on a display associated with the computing device, wherein receiving an indication of a selection of a part of the merged image presented on the display causes the UAV to send, to the computing device, a third image captured by the first camera and corresponding to the selected part of the merged image for updating the composite image to include the third image within the composite image.

17. The UAV as recited in claim 16, wherein the plurality of second cameras together capture a 360 degree field of view of a space around the UAV, and the merged image provides the 360 degree field of view around the UAV.

18. The UAV as recited in claim 17, wherein the merged image and the first image, when presented on the display, enable a user to zoom out from the first image to the 360 degree field of view provided by the merged image by interpolating between the first image received from the first camera and the merged image received from the second cameras.

19. The UAV as recited in claim 15, wherein the operation of combining at least some of the plurality of second images to generate the merged image includes using at least one range map to align one or more of the second images with another one or more of the second images, the range map indicating an estimated distance from the UAV to at least one object included in at least one of the second images.

20. The UAV as recited in claim 15, the operations further comprising:
  determining, based at least on information received from an accelerometer, an attitude of the UAV; and
  rotating the merged image based at least on the attitude of the UAV prior to the presentation of the composite image.

* * * * *